United States Patent
Smith et al.

(10) Patent No.: US 11,577,903 B2
(45) Date of Patent: Feb. 14, 2023

(54) PACKAGING FILMS

(71) Applicant: JOHNSON MATTHEY PUBLIC LIMITED COMPANY, London (GB)

(72) Inventors: Andrew William John Smith, Berkshire (GB); Andrew Cornish, Berkshire (GB); Han Xu, Berkshire (GB)

(73) Assignee: Johnson Matthey Public Limited Company, London (GB)

( * ) Notice: Subject to any disclaimer, the term of this patent is extended or adjusted under 35 U.S.C. 154(b) by 634 days.

(21) Appl. No.: 16/604,364

(22) PCT Filed: Apr. 10, 2018

(86) PCT No.: PCT/GB2018/050945
§ 371 (c)(1),
(2) Date: Oct. 10, 2019

(87) PCT Pub. No.: WO2018/189519
PCT Pub. Date: Oct. 18, 2018

(65) Prior Publication Data
US 2020/0148449 A1    May 14, 2020

(30) Foreign Application Priority Data

Apr. 11, 2017    (GB) ..................... 1705797

(51) Int. Cl.
| | | |
|---|---|---|
| *B01J 20/16* | (2006.01) | |
| *B01D 53/04* | (2006.01) | |
| *B65D 81/26* | (2006.01) | |
| *A23B 7/152* | (2006.01) | |
| *B01J 20/18* | (2006.01) | |
| *B01J 20/28* | (2006.01) | |
| *B01J 20/32* | (2006.01) | |

(52) U.S. Cl.
CPC ............ *B65D 81/267* (2013.01); *A23B 7/152* (2013.01); *B01J 20/165* (2013.01); *B01J 20/186* (2013.01); *B01J 20/28004* (2013.01); *B01J 20/28026* (2013.01); *B01J 20/28033* (2013.01); *B01J 20/3236* (2013.01)

(58) Field of Classification Search
CPC ..... A23B 7/152; A23L 3/3427; B65D 81/267; Y02A 50/20; B01D 53/02; B01D 53/04; B01D 53/0407; B01D 2253/108; B01D 2253/1085; B01D 2253/1122; B01D 2253/1124; B01D 2253/25; B01D 2257/708; B01J 20/165; B01J 20/186; B01J 20/261; B01J 20/28044; B01J 20/28026; B01J 20/28033; B01J 20/3007; B01J 20/3236
USPC ........ 96/153, 154; 95/143, 144; 502/66, 400
See application file for complete search history.

(56) References Cited

U.S. PATENT DOCUMENTS

| | | | | |
|---|---|---|---|---|
| 7,387,205 | B1 * | 6/2008 | Wilson | B65D 81/268 206/524.4 |
| 2006/0272508 | A1 * | 12/2006 | Hoke | B01D 53/0415 96/134 |
| 2008/0287707 | A1 * | 11/2008 | Ilkenhans | B01J 20/28035 585/820 |
| 2011/0072967 | A1 * | 3/2011 | Wood | C09D 105/16 96/135 |
| 2011/0300768 | A1 * | 12/2011 | Gurudatt | B65D 81/28 427/372.2 |
| 2012/0160100 | A1 | 6/2012 | Rowsell et al. | |
| 2013/0131232 | A1 | 5/2013 | Sooknoi et al. | |
| 2015/0158019 | A1 * | 6/2015 | Rajaram | F01N 3/0821 422/171 |
| 2016/0151761 | A1 * | 6/2016 | Smith | B01J 20/28035 502/62 |
| 2019/0225404 | A1 * | 7/2019 | Tatlock | B32B 27/12 |
| 2021/0053007 | A1 * | 2/2021 | Ashfield | B01D 53/0407 |

FOREIGN PATENT DOCUMENTS

| | | |
|---|---|---|
| JP | H03280827 A | 12/1991 |
| JP | H04325070 A | 11/1992 |
| WO | 2007052074 A2 | 5/2007 |
| WO | 2016125050 A1 | 8/2016 |
| WO | 2016181132 A1 | 11/2016 |

OTHER PUBLICATIONS

Machine-generated English translation of JP H03-280827 A, published Dec. 1991.*
GB1705797.7, Search Report Under Section 17(5) dated Oct. 10, 2017.
PCT/GB2018/050945, International Search Report dated Jul. 13, 2018.
PCT/GB2018/050945, Written Opinion dated Jul. 13, 2018.

* cited by examiner

*Primary Examiner* — Frank M Lawrence, Jr.
(74) *Attorney, Agent, or Firm* — BakerHostetler

(57) ABSTRACT

A packaging film is described comprising at least one polymer film layer in which particles of a small-pore or a medium-pore palladium-doped zeolite are dispersed. Such films are of particular utility for the adsorption of volatile organic compounds, such as those originating from organic matter.

12 Claims, 2 Drawing Sheets

PACKAGING FILMS

CROSS-REFERENCE TO RELATED APPLICATIONS

This application is the National Stage of International Patent Application No. PCT/GB2018/050945, filed Apr. 10, 2018, which claims priority to Great Britain Patent Application No. 1705797.7, filed Apr. 11, 2017, the entire disclosures of both of which are incorporated herein by reference for any and all purposes.

FIELD OF THE INVENTION

This invention relates to packaging films comprising small-pore or medium-pore palladium-doped zeolites for the removal of volatile organic compounds (VOCs), in particular ethylene, methods of formation of such packaging films, and their use for the adsorption of VOCs originating from organic matter.

BACKGROUND TO THE INVENTION

The over-ripening or spoiling of fruit, vegetables and other organic matter during transit or storage can lead to significant produce loss and wastage. This is an increasing issue for those involved in fresh produce supply chains which may involve long transit times and variable climatic conditions. Modification of the atmosphere in which the organic matter is stored has been shown to be an effective strategy to prolong produce life. For example, alterations in oxygen and carbon dioxide levels within produce packaging can reduce produce respiration rates and therefore slow down the spoiling of fresh produce.

Other strategies involve the removal of volatile organic compounds (VOCs) from within, or surrounding, produce packaging. VOCs are typically emitted by the produce itself, or may be present in the environment in which the produce is stored or transported. The presence of such VOCs can for example accelerate the spoiling of produce, lead to unwanted odours or tastes, or produce colour changes or other changes in appearance.

One such VOC is ethylene. Ethylene is a plant hormone and has a key role in many physiological processes in plants. For example, exogenous ethylene can initiate fruit ripening which in turn can lead to release of ethylene as the fruit ripens leading to high local concentrations. Other fresh produce types are also sensitive to ethylene even if their own ethylene production is low. The rate of ethylene generation can be a key factor in determining local ethylene concentrations, and this rate varies significantly between produce types. Excessive ethylene levels can lead to, for example, the premature ripening of fruit and vegetables, the wilting of fresh flowers, and the loss of green colour and an increase in bitterness of vegetables.

The control of ambient ethylene levels has been found to be an effective strategy in prolonging the shelf-life of many horticultural products, and various methods of ethylene control are utilised commercially. Methods include those based on ethylene adsorption and oxidation, for example the use of potassium permanganate.

Palladium-doped zeolites have been found to act as ethylene adsorbents. For example, it is described in WO2007/052074 (Johnson Matthey Public Limited Company) that palladium-doped ZSM-5 may be used to adsorb VOCs such as ethylene which are derived from organic matter.

Adsorbents used to remove VOCs are typically used in the form of a powder or as granules. In the case of use within a fresh produce package the adsorbent material is typically incorporated into a label attached to the inside of the package, or may be contained within a sachet, pad or other insert located within the package.

It would be advantageous to incorporate the adsorbent materials into packaging films as an alternative to providing the adsorbent inside a sachet, pad or other type of insert. In this case the adsorbent material would be more widely dispersed within the package and could be protected from direct contact with water. Furthermore, if the adsorbent material is combined with the primary packaging there is no need for an additional insert or inserts to be placed inside the packaging. These advantages could lead to less adsorbent material being included, reduced packaging material, and fewer processing steps.

WO2016181132A1 (Innovia Films Ltd, Food Freshness Technology Holdings Ltd) describes a film for use in a packaging structure which comprises a coating on the film surface which comprises a binder and a particulate protuberent component able to remove VOCs. The examples describe the use of a palladium doped zeolite as the protuberent component and ZSM-5 is mentioned.

The incorporation of adsorbents into a polymer film rather than bound in a surface coating may be advantageous, for example to avoid issues with coating stability, and to enhance the protection of the adsorbent material from moisture. However, the combination of adsorbent and polymeric materials remains challenging, as the incorporation of adsorbent materials into polymeric materials typically leads to a significant loss of adsorbent capacity and/or rate of adsorption, leading to poor performance. Resulting materials may also suffer from low stability. There remains a need to develop additional materials incorporating adsorbents which are suitable for use with fresh produce such as packaging films.

SUMMARY OF THE INVENTION

It has surprisingly found that polymeric films may be produced incorporating palladium-doped zeolites with small or medium pore frameworks which retain a significant proportion of VOC adsorption capacity, whilst maintaining a rate of removal such that the films are suitable for use as packaging materials with a range of produce types. It has also been found that stable polymeric films may be prepared which comprise these zeolite materials.

Therefore, in a first aspect of the invention there is provided a packaging film for the adsorption of VOCs, in particular VOCs originating from organic matter, comprising at least one polymer film layer, wherein particles of a small-pore or a medium-pore palladium-doped zeolite are dispersed in the polymer film layer.

Preferably the zeolite is a small-pore zeolite, for example zeolites with a CHA or AEI framework type, in particular CHA.

The films are obtainable by a compounding and extrusion process and it has been found by the inventors that certain zeolite framework types have an unexpectedly high retention of adsorption capacity despite the polymer processing conditions which are used to form the polymer film layer, which include high temperatures and the grinding of the adsorbent with the polymeric material.

Therefore, in a second aspect of the invention there is provided a process for preparing a polymer film for the adsorption of VOCs, in particular VOCs originating from organic matter, and packaging films comprising at least one polymer film layer obtainable by the process, the process comprising the steps of (i) compounding at least one polymer and particles of a small pore or a medium pore palladium-doped zeolite; (ii) extruding the compounded mixture to form the polymer film.

The compounded mixture may be isolated as a masterbatch prior to extrusion. Isolating a masterbatch can help facilitate transportation and storage of the adsorbent material, and simplify manufacturing of the packaging films.

Therefore, in a third aspect of the invention there is provided a masterbatch for preparing a polymer film for the adsorption of VOCs, in particular VOCs originating from organic matter, the masterbatch comprising a polymer and particles of a small pore or a medium pore palladium-doped zeolite.

In a fourth aspect of the invention there is provided a packaging film for the adsorption of VOCs, in particular VOCs originating from organic matter, comprising at least one polymer film layer, the polymer film layer comprising a masterbatch as described herein.

The packaging films of the invention have particular utility for the adsorption of VOCs, in particular ethylene, originating from organic matter such as fruit, vegetables and cut flowers.

DETAILED DESCRIPTION OF THE INVENTION

Figure 1:
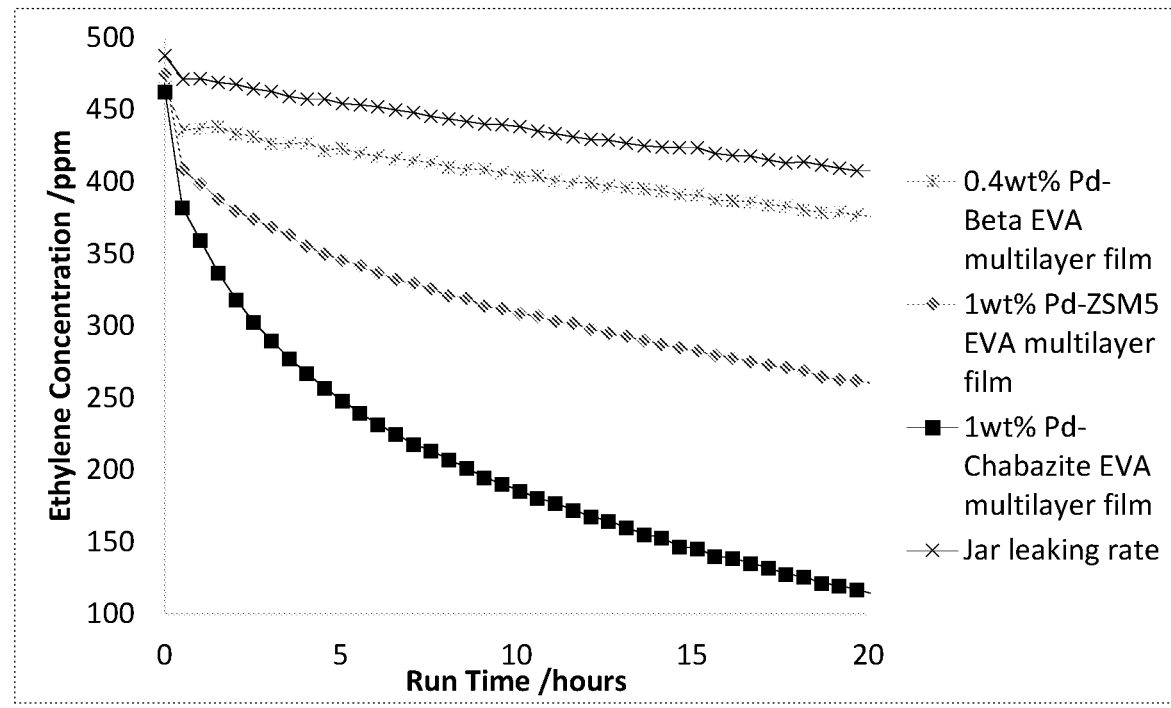
FIG. 1 shows the results of ethylene adsorption testing of polymer films incorporating Pd-doped zeolite particles with different framework types.

This invention relates to polymer films incorporating small or medium pore palladium-doped zeolite particles. Zeolites may be classified by the number of T atoms, where T=Si or Al, that define the pore openings. Zeolites are referred to as small-pore (maximum pore size 8-membered ring), medium-pore (maximum pore size 10-membered ring) or large-pore (maximum pore size 12-membered ring). This invention relates to zeolites with small-pore or medium-pore frameworks, preferably zeolites with a small-pore framework.

Framework types may also be classified by the maximum diameter of a sphere that can diffuse along a channel of the zeolite framework. Preferably, the maximum diameter is less than 5 Å, for example between 3 Å and 5 Å, more preferably less than 4 Å, for example between 3 Å and 4 Å. Such data is provided for example in the Database of Zeolite Structures (Structure Commission of the International Zeolite Association, http://www.iza-structure.org/databases/).

Preferred zeolite framework types include medium-pore zeolites with an MFI framework type and small-pore zeolites with a AEI or CHA framework type. The three-letter codes used herein represent a framework type in accordance with the "IUPAC Commission on Zeolite Nomenclature" and/or the "Structure Commission of the International Zeolite Association".

It is preferred that the framework type is selected from AEI or CHA, more preferably CHA. It will be understood that the zeolites may include regions in which the framework is a mixture or intergrowth, such as a CHA/AEI intergrowth, however it is generally preferred that the zeolite has a framework that is not an intergrowth of more than one framework type.

The zeolite typically has a silica to alumina molar ratio (SAR) of less than or equal to 100:1, such as between 10:1 and 50:1, preferably 10:1 to 40:1, more preferably 20:1 to 30:1.

The zeolite framework may be counterbalanced by cations, such as by cations of alkali and/or alkaline earth elements (e.g. Na, K, Mg, Ca, Sr, and Ba), ammonium cations and/or protons. Preferably, the zeolite is in the hydrogen form.

The zeolite is doped with palladium, and typically comprises 0.1 to 10 wt % palladium based on the total weight of doped zeolite, preferably 0.2 to 2 wt %, 0.3 to 1.8 wt %, 0.3 to 1.6 wt %, 0.3 to 1.4 wt %, more preferably 0.3 to 1.2 wt %, 0.4 to 1.2 wt %, 0.6 to 1.2 wt %, or 0.8 to 1.2 wt %.

Such zeolites are typically prepared by incipient wetness impregnation using a palladium nitrate solution, drying the particles, and then calcining at a temperature between 450 and 750° C.

The zeolite particles are dispersed in a polymer film layer. Suitable polymeric materials include polyvinyl chlorides, polyethylenes, polypropylenes, ethylene-vinyl acetate co-polymers, polystyrenes, polybutylenes, polycarbonates, polyamides, polyesters, polyethylene terephthalates and, or mixtures, blends and co-polymers thereof. Preferably, the polymer is an ethylene vinyl acetate co-polymer, a low-density polyethylene, a high-density polypropylene, a polypropylene, or a high impact polystyrene. More preferably, the polymer is an ethylene vinyl acetate co-polymer or a low-density polyethylene.

Preferably, polymers, or mixtures of polymers, are selected which have high gas permeability so that the polymeric material is not detrimental to VOC adsorption rate.

The gas permeation rate is a measure of the extent to which a material can act as a barrier to a gas. One known unit for the gas permeation rate of a polymer is cubic centimeters of a gas at standard temperature and pressure passing through a one-micron film, with an area of a square metre, over a period of one hour, with a partial pressure differential of the gas of one standard atmosphere. This known unit is abbreviated as $cm^3 \cdot \mu m/m^2 \cdot h \cdot atm$. The gas permeation rate is temperature dependent. One known convention for testing of films is to test at 25° C. and 0% relative humidity (RH). The permeation rate for a given polymer also depends on the gas itself. It has been found that the permeation rate of carbon dioxide is a good surrogate for VOCs, in particular ethylene. Therefore, preferably the polymer film layer comprises a polymer, or mixture of polymers, with a carbon dioxide permeability rate of $>1.00e+02$ $cm^3 \cdot \mu m/m^2 \cdot h \cdot atm$ at 25° C. and 0% RH, more preferably $>1.00e+04$ $cm^3 \cdot \mu m/m^2 \cdot h \cdot atm$. The carbon dioxide transmission rate through a film may be measured using standard methods such as ASTM F 2478 'Standard Test Method for the Determination of Carbon Dioxide Gas Transmission Rate ($CO_2TR$) Through Barrier Materials Using An Infrared Detector'. The carbon dioxide permeation rate is the $CO_2TR$ normalised to the material thickness and pressure gradient.

The packaging films described herein comprise a polymer film layer which is obtainable by a polymer extrusion process. The selected polymeric materials are compounded with the palladium-doped zeolite particles, for example using a twin screw extruder. The films are then produced by extrusion, for example by blown film or cast film extrusion.

It will be understood by the skilled person that the compounding and extrusion steps may carried out as single process or that the compounded mixture may be isolated as a masterbatch prior to film formation. If isolated, the compounded material is typically pelletized as part of this process. The formation of masterbatch may be advantageous, for example to facilitate transportation of the adsorbent and to enable production of the packaging films using standard polymer processing facilities.

It has been found that the maintaining a relatively low temperature during the compounding and/or extrusion steps can be advantageous with regards to retention of VOC adsorption capacity of the zeolite material. Typically, the compounding and/or extrusion steps may be carried out at a temperature of less than 200° C., such as between 120° C. and 180° C. For example, if the polymer material is an ethylene-vinyl acetate copolymer the temperature of the compounding and/or extrusion steps is typically between 120° C. and 180° C., preferably between 120° C. and 170° C., more preferably between 120° C. and 150° C., even more preferably between 120° C. and 140° C. If the polymer material is a low-density polyethylene then the temperature of the compounding and/or extrusion steps is typically between 150° C. and 190° C., preferably between 150° C. and 180° C., more preferably between 150° C. and 170° C.

The masterbatch typically contains zeolite particles in the range 1-50 wt % based on the total weight of the masterbatch material.

Polymer films as described herein are then obtainable by extruding the masterbatch, with or without the addition of further polymeric material depending on the desired loading of palladium-doped zeolite in the formed film. Suitable extrusion processes include blown film or cast film extrusion.

Typically, the polymer film layer will have a thickness of between 5 to 100 μm, preferably 5 to 30 μm. The palladium-doped zeolite particles are dispersed in the polymer film layer, typically at a zeolite loading of 1 to 50 wt % based on total weight of polymer film, preferably at a zeolite loading of 1 to 10 wt % based on a total weight of polymer film.

The zeolite particles typically have a size (d50) of 1 μm to 25 μm, preferably 5 and 10 μm. The particle size distribution (and therefore the d50) within the polymer films may be measured, for example, by scanning electron microscopy.

The packaging films may be a single polymer layer as described herein, or may comprise a laminate structure of two or more layers which may be the same or different materials. Preferably, the packaging film does not comprise a coating on the film surface which incorporates an adsorbent material.

In one arrangement, the packaging film comprises or consists essentially of a film with a single polymer layer in which particles of the zeolite are dispersed.

In further arrangement, the packaging film comprises two or more polymer film layers, the packaging film having at least one layer in which the zeolite particles are dispersed. It will be understood by the skilled person that in the case which the packaging films comprise at least three layers, the layer or layers in which the zeolite particles are dispersed is preferably an exterior layer of the packaging film. Such packaging layers may be formed, for example, by a co-extrusion or lamination process.

Typically, the packaging films will have a thickness of between 5 μm to 200 μm, preferably 10 to 100 μm, more preferably 10 to 40 μm.

The packaging film may additionally comprise a gas-permeable barrier layer, for example a silicone rubber, or other synthetic or natural rubber material, which may improve the stability of the packaging film and which may be advantageous in particular for food or other consumable packaging applications, for instance the gas-permeable barrier layer can prevent particulate additives included in the polymer matrix from migrating to the film surface, and therefore prevent contact between the additives and the packaging contents. The barrier layer may be applied by a coating process, a lamination process or by extrusion during a film blowing process.

The packaging films may additionally comprise an anti-fog additive. Such additives are known to those skilled in the art, and may comprise a detergent and/or a surfactant.

The zeolites and films as described herein may be advantageously used for the adsorption of VOCs. The VOCs may be, for example, plant growth regulators such as ethylene, odorous species such as ammonia, or acetic acid, and other by-products of produce decomposition such as trimethylamine.

The zeolites and films as described herein may be advantageously used for the adsorption of VOCs originating from organic matter, such as fruit, vegetables, cut flowers, or other foodstuffs. The VOC is typically ethylene. In particular, the zeolites and films may be used for the adsorption of ethylene originating from climacteric produce, such as bananas, avocados, nectarines, melons and pears which release a burst of ethylene during ripening, accompanied by an increase in respiration. Other non-climacteric produce types which are sensitive to ethylene include potatoes, onions, broccoli, cabbage and cut flowers.

Typically, the organic matter is contained in a packaging structure during storage and transportation, such as a crate, bag, bottle, box or punnet. The packaging films may therefore be advantageously used to control ethylene levels within such packaging structures.

The packaging films may be used to seal the packaging structure, for example to seal a punnet or a box, or may, for example, form the majority of the packaging structure, such as in the case of a bag, or the packaging film may be used to wrap produce or wrap containers of produce, such as boxes.

It will be understood that in the case of multi-layer films the layer incorporating the zeolite particles is typically presented to the interior of the packaging structure facilitating the control of the atmospheric composition within the structure. It may be envisaged however that the outermost layer of the packaging film may alternatively or in addition incorporate zeolite particles, in order to adsorb VOCs generated externally to the packaging structure, for example during transportation.

The packaging structure may comprise a polymer film that is perforated, for example with holes or slits which are typically 50-500 μm in diameter or length as appropriate. Such perforations may be formed by laser perforation. In use, the degree of perforation may be used to control the gaseous composition within the packaging structure once produce has been placed inside, leading to a lower oxygen content. Such a packaging structure may be known as modified atmosphere packaging. Both unmodified and modified atmosphere packaging structures may be used with packaging films as described herein.

It should be noted that the term "adsorbent" and "adsorption" as used herein should not be construed as being limited to the uptake of VOCs to a particular route and includes the chemical conversion of VOCs into secondary compounds. As used herein, the term "adsorbent" is synonymous with "absorbent".

The expression "consists essentially" as used herein limits the scope of a feature to include the specified materials, and any other materials or steps that do not materially affect the basic characteristics of that feature, such as for example minor impurities. The expression "consists essentially of" embraces the expression "consisting of".

EXAMPLES

The invention is now illustrated with the following non-limiting examples:

Example Preparation of Palladium-Doped Zeolites

1% Pd-doped H-chabazite (SAR=22): Samples were prepared by incipient wetness impregnation. Pd nitrate (~8%) solution was weighed out to give the desired weight % of metal on the zeolite. The Pd nitrate solution was then diluted with water up to around 60-70% pore fill of the zeolite. The solution was added to the zeolite powder (obtained from Tosoh Corporation) using a pipette and every few drops added the solution was manually stirred and 'wet lumps' were broken up using a spatula to keep the sample as homogenous as possible. The sample was then dried at 105° C. (2 hr) and then calcined at a temperature of 500° C. for 2 hrs with a 10° C./min ramp rate.

The samples of 1% Pd-doped H-ZSM-5 (SAR=23) and 0.4% Pd-doped H-beta zeolite (SAR=28) were prepared according to the described method with the following changes to conditions: (i) The Pd nitrate solution was diluted with water up to around 95% pore fill of the zeolite; (ii) the drying time was 18 hr.

Example Preparation of Polymer Masterbatches Incorporating Pd-Doped Zeolites

A twin screw extruder (Dr Collin) was used to compound Pd-doped zeolite particles with the selected polymer. Twin screw compounding speed was 20 rpm with a set temperature between 120 and 180° C. The compounded material was then pelletised into a masterbatch.

Example 1—Preparation of Ethyl-Vinyl Acetate Films Incorporating Pd-Doped Zeolite Particles with Different Framework Types A twin screw extruder (Dr Collin) was used to compound ethylene-vinyl acetate (EVA FL00209) with Pd-doped zeolite particles with different framework types as described above at a temperature of 130° C. The zeolite and polymer addition rates were adjusted so as to result in a film with around 1.5 wt % palladium-doped zeolite. The compounded mixtures were then extruded through a blown film line to produce multilayer structures (20 μm), using the following conditions:

Inner layer (EVA):
Extrusion speed: 25 rpm
Temperature profile from feeding zone to die adaptor (° C.): 30, 130, 130, 130, 130
Middle layer (EVA):
Extrusion speed: 25 rpm
Temperature profile from feeding zone to die adaptor (° C.): 30, 130, 130, 130, 130
Outer layer (EVA+absorbent):
Extrusion speed: 50 rpm
Temperature profile (° C.) from feeding zone to die: 30, 130, 130, 130, 130, 130, 130 and 130

The zeolite loading in the produced films was confirmed by an ash test. The test involved heating a sample of the films to 500° C. for 5 hours. The zeolite loading was then calculated using the formula:

Zeolite loading=Net ash/Net film*100%

According to the film ash test results, the tested film had a zeolite loading as follows:
Pd-Chabazite—1.57 wt %;
Pd-ZSM-5—1.45 wt %;
Pd-beta—1.89 wt %;

Testing of Polymer Films

A series of experiments were conducted to evaluate the ethylene removal performance of different palladium-doped zeolites to compare their performance after incorporation into the polymer film vs as a powder.

Ethylene Uptake Measurement

A film containing ca. 0.2 g zeolite was prepared and placed into a sealed 1990 ml jar. Ethylene gas was injected into the jar and reached 500 ppm. The inner atmosphere in the jar was analysed at regular intervals. The concentration of ethylene was determined by GC analysis. Temperature and humidity in the jar were maintained at 5° C. and RH 90~95% during the test.

Results

FIG. 1 shows the results of ethylene adsorption testing. 1% Pd-chabazite (SAR 22) was found to remove ethylene continuously over the period of the study with a high removal rate, and with a particularly advantageous profile in comparison with the other framework types tested.

Figure 2:
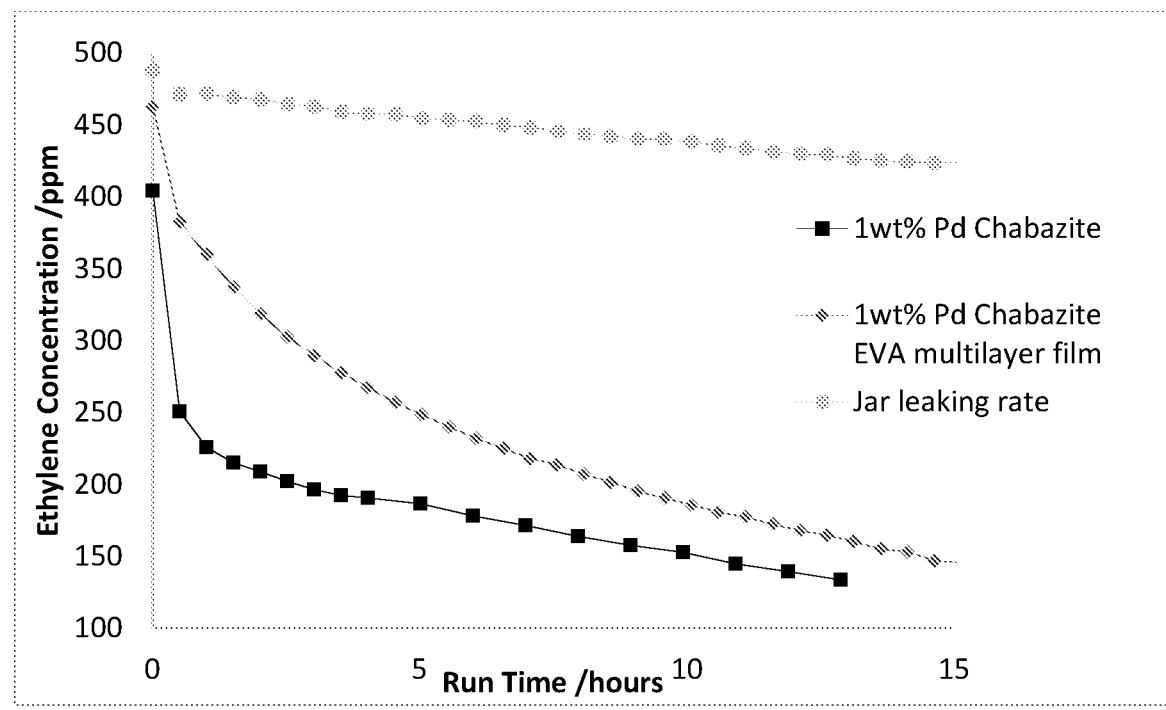
FIG. 2 shows the results of ethylene adsorption testing of 1% Pd-doped chabazite in the form of a powder and incorporated into a multi-layer film.

Example 2—Comparison of the Ethylene Removal Capacity of the Multi-Layer Polymer Film Incorporating Pd-Doped Chabazite Particles and Pd-Doped Chabazite Powder 0.2 g of 1% Pd-Chabazite powder and an EVA multilayer film incorporated with 0.199 g of 1% Pd-Chabazite powder were prepared as described in example 1. The ethylene removal performance of both were evaluated in the ethylene uptake test, at wet and low temperature conditions (5° C. and RH90~95%), which can mimic food storage conditions. The ethylene removal performance of the multilayer film was shown in FIG. 2. It was found the film retained around ca. 80% activity of the zeolite powder.

Example 3—Preparation and Testing of a LDPE Polymer Film

A twin screw extruder (Dr Collin) was used to compound low density polyethylene (Lupolen 3020H) with 1% Pd-doped chabazite particles to form a masterbatch as described above at a temperature of 160° C. The zeolite and polymer addition rates were adjusted so as to result in a film with around 2 wt % palladium-doped zeolite The compounded mixture was then extruded through a blown film line to produce multilayer structures (20 μm), using the following conditions:

Inner layer (LDPE):
Extrusion speed: 25 rpm
Temperature profile from feeding zone to die adaptor (° C.): 30, 160, 160, 160, 160
Middle layer (LDPE):
Extrusion speed: 25 rpm
Temperature profile from feeding zone to die adaptor (° C.): 30, 160, 160, 160, 160
Outer layer (LDPE+absorbent):
Extrusion speed: 50 rpm Temperature profile (° C.) from feeding zone to die: 30, 160, 160, 160, 160, 160, 160 and 160

According to the film ash test results, the tested film had a zeolite loading as follows:

Pd-Chabazite—2.08 wt %

Testing of Polymer Films

A series of experiments were conducted to evaluate the ethylene removal performance of different palladium-doped zeolites to compare their performance after incorporation into the polymer film vs as a powder.

Ethylene Uptake Measurement

A film containing 0.208 g zeolite was prepared and placed into a sealed 1990 ml jar. Ethylene gas was injected into the jar and reached 500 ppm. The inner atmosphere in the jar was analysed at regular intervals. The concentration of ethylene was determined by GC analysis. Temperature and humidity in the jar were maintained at 5° C. and RH 90~95% during the test.

Figure 3:
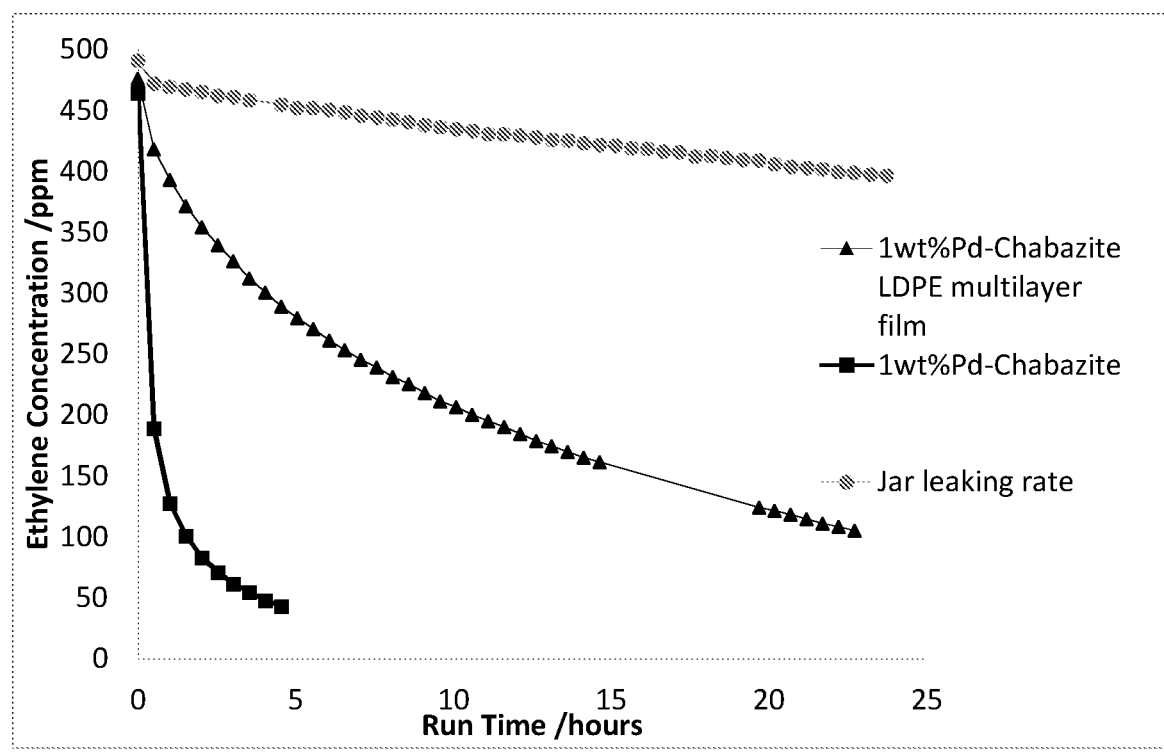
FIG. 3 shows the results of ethylene adsorption testing of a LDPE film incorporating 1% Pd-doped chabazite.

Ethylene Uptake: The LDPE film and zeolite powder (control=1% Pd-chabazite powder) were tested for ethylene uptake as described above Results The ethylene removal performance of the LDPE multilayer film was shown in FIG. 3. It was found the film retained around ca. 60~70% activity of the zeolite powder.

The invention claimed is:

1. A packaging film for the adsorption of volatile organic compounds comprising at least one polymer film layer, wherein particles of a small-pore or a medium-pore palladium-doped zeolite are dispersed in the polymer film layer, and wherein the palladium-doped zeolite is in the hydrogen form.

2. The packaging film according to claim 1 wherein the polymer film layer comprises a polymer selected from an ethylene vinyl acetate co-polymer, a low-density polyethylene, a polypropylene, or a high impact polystyrene.

3. The packaging film according to claim 1 wherein the zeolite has a framework type that is chabazite.

4. The packaging film according to claim 1 wherein the polymer film layer comprises 1 to 10 wt % of said palladium-doped zeolite.

5. The packaging film according to claim 1 wherein said palladium-doped zeolite comprises 0.2 to 2 wt % palladium based on the total weight of said palladium-doped zeolite.

6. The packaging film according to claim 1 wherein the polymer film layer has a thickness of 5 to 30 μm.

7. The packaging film according to claim 1 wherein the palladium-doped zeolite particles have a particle size (d50) between 5 and 10 μm.

8. The packaging film according to claim 1 consisting essentially of the polymer film layer.

9. The packaging film according to claim 1 comprising a gas permeable barrier layer.

10. A packaging structure comprising a film according to claim 1.

11. A method of adsorbing volatile organic compounds originating from organic matter using a packaging film according to claim 1.

12. The method according to claim 11 wherein the volatile organic compound is ethylene.

* * * * *